(12) United States Patent
Zhang et al.

(10) Patent No.: US 8,537,809 B2
(45) Date of Patent: Sep. 17, 2013

(54) SEPARATION DEVICE AND METHOD FOR TRANSMITTING VOICE SIGNAL

(75) Inventors: Ke Zhang, Shenzhen (CN); Xin Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 130 days.

(21) Appl. No.: 13/078,469

(22) Filed: Apr. 1, 2011

(65) Prior Publication Data

US 2011/0182286 A1    Jul. 28, 2011

Related U.S. Application Data

(63) Continuation of application No. PCT/CN2009/072961, filed on Jul. 28, 2009.

(30) Foreign Application Priority Data

Oct. 25, 2008   (CN) .......................... 2008 1 0218714

(51) Int. Cl.
*H04L 12/66*   (2006.01)
(52) U.S. Cl.
USPC ......................................................... 370/352
(58) Field of Classification Search
USPC .......................................... 370/352, 261, 463
See application file for complete search history.

(56) References Cited

U.S. PATENT DOCUMENTS

| | | | |
|---|---|---|---|
| 6,519,250 B1 | 2/2003 | Fan | |
| 2003/0088767 A1* | 5/2003 | Emerson, III | 713/153 |
| 2003/0118039 A1 | 6/2003 | Nishi et al. | |
| 2004/0107299 A1* | 6/2004 | Lee et al. | 709/249 |

(Continued)

FOREIGN PATENT DOCUMENTS

| | | |
|---|---|---|
| CN | 1427592 A | 7/2003 |
| CN | 101163175 A | 4/2008 |
| GB | 1 452 386 | 10/1976 |

OTHER PUBLICATIONS

Written Opinion of the International Searching Authority issued in Corresponding PCT Patent Application No. PCT/CN2009/072961, mailed Nov. 5, 2009.
Office Action issued in corresponding European Patent Application No. 09173947.4, mailed Jun. 1, 2012.

(Continued)

*Primary Examiner* — Chi Pham
*Assistant Examiner* — Fahmida Chowdhury
(74) *Attorney, Agent, or Firm* — Brinks Hofer Gilson & Lione

(57) ABSTRACT

A separation device and a method for transmitting voice signal are disclosed. The separation device includes a line interface adapted to provide an interface for connecting to a telecommunication access system which provides public switched telephone network (PSTN) and data services; a data interface adapted to provide an interface connected with customer premises equipment (CPE) and connected with the line interface; a first communication interface adapted to provide an interface connected with a PSTN communication terminal; a second communication interface adapted to provide an interface connected with a foreign exchange station (FXS) interface of the CPE; and a connection switching unit adapted to connect the first communication interface with the line interface or connect the first communication interface with the second communication interface, and to perform switching between the two connections to implement PSTN communication or VoIP communication respectively. The solution in the embodiment may help perform switching with a PSTN communication terminal connection line according to different call types so that the PSTN communication terminal may implement the PSTN communication and the VoIP communication respectively.

15 Claims, 4 Drawing Sheets

(56) References Cited

U.S. PATENT DOCUMENTS

| | | |
|---|---|---|
| 2004/0240432 A1 | 12/2004 | Ying et al. |
| 2005/0025043 A1 | 2/2005 | Mussman et al. |
| 2005/0073995 A1* | 4/2005 | Yeh et al. ..................... 370/352 |
| 2007/0025338 A1* | 2/2007 | Benditovich et al. ......... 370/352 |
| 2008/0089356 A1 | 4/2008 | Hsu et al. |

OTHER PUBLICATIONS

European Search Report issued in corresponding European Patent Application No. 09173947.4; mailed Feb. 26, 2010.

International Search Report issued in corresponding PCT Application No. PCT/CN2009/072961; mailed Nov. 9, 2009.

\* cited by examiner

SEPARATION DEVICE AND METHOD FOR TRANSMITTING VOICE SIGNAL

CROSS-REFERENCE TO RELATED APPLICATION

This application is a continuation of International Application No. PCT/CN2009/072961, filed on Jul. 28, 2009, which claims priority to Chinese Patent Application No. 200810218714.4, filed on Oct. 25, 2008, both of which are hereby incorporated by reference in their entireties.

FIELD OF THE TECHNOLOGY

The application relates to the communication field, in particular to a separation device and a method of voice signal transmission.

BACKGROUND

Multiple modes are available for completing the last one kilometer broadband data access in a communication system, and the relatively common access mode is implemented through a digital subscriber line (xDSL).

FIG. 1 is a connection schematic diagram of an existing home network accessed through the xDSL. The relatively common broadband communication equipment at a subscriber's side is referred to as customer premises equipment (CPE) or home gateway (HGW) marked with HGW in the figure. A digital subscriber line access multiplexer (DSLAM) and an exchange in a telecommunication central office (CO) of an operator are connected with the HGW and other equipment in the home network through an xDSL twisted pair.

The xDSL twisted pair is employed to transmit data, and may share a line with a public switched telephone network (PSTN) without rewiring. Service treatment is sorted according to different signal frequency bands: analog signal frequency bands of PSTN services are generally smaller than 4 kHz, but data service signals are located in frequency bands larger than 4 kHz. And non-interference may be ensured by proper filtering. That is, the twisted pair in FIG. 1 may bear DSL broadband data and may also bear PSTN telephone services, and the DSL broadband data include asymmetric digital subscriber line (ADSL) broadband data.

A home telephone service system is likely to wire in a subscriber's walls, then interfaces (marked as A/B/C in the figure) are set in different rooms, signals transmitted through the xDSL twisted pair are low-pass filtered in a downlink direction by a filter 2 and a filter 3, and telephone set 2 and telephone set 3 may make a PSTN phone call.

The HGW receives and transmits the DSL broadband data through a twisted pair system; and an HGW may accomplish data interaction by interfacing a DSL interface and the twisted pair system in an uplink direction. The HGW may interface with equipment such as a computer, a set top box, etc. through a fast Ethernet interface (FE) in a downlink direction to realize the function of surfing on the Internet; in a downlink direction, a universal serial bus (USB) interface may link to a printer or a USB storage device to complete corresponding functions; in the downlink direction, a Plain Old Telephone Service (POTS) interface may link to a common telephone set or facsimile apparatus to complete Internet-based voice over IP (VoIP) functions, for example, a telephone set is linked to the POTS interface in the downlink direction. And in the HGW, an analog signal is sampled, compressed, packaged and transformed into data signals which may be accepted by an xDSL protocol to complete data interaction with a DSLAM at the CO. In the process, the conventional analog telephone sets may dial a VoIP telephone.

However, the applicant finds that telephone sets (the telephone set 2 and the telephone set 3) in other rooms can only use PSTN telephone services not VoIP telephone services in the above technical conditions, and this limits available services of the telephones in other rooms.

SUMMARY

Various embodiments provide a separation device and a method for transmitting voice signal, which enables a user's telephones which use the conventional PSTN services to be capable of switching to use VoIP telephone services while using the PSTN services, which adds available services of the telephones using the conventional PSTN services without changing other equipment of a home network and a telecommunication network.

An embodiment provides a separation device. The separation device includes a line interface which is adapted to provide an interface for connecting to a telecommunication access system which provides PSTN and data services; a data interface which is adapted to provide an interface connected with CPE and adapted to connected with the line interface; a first communication interface which is adapted to provide an interface connected with a PSTN communication terminal; a second communication interface which is adapted to provide an interface connected with a foreign exchange station (FXS) interface of the CPE; and a connection switching unit which is adapted to connect the first communication interface with the line interface or connect the first communication interface with the second communication interface, and to perform switching between the two connections so as to implement PSTN communication or VoIP communication respectively.

On the other hand, an embodiment further provides a method for transmitting voice signal by the separation device. The method includes that: the connection switching unit of the separation device learns that a PSTN communication terminal connected with the first communication interface requires to initiate VoIP communication connection through the first communication interface; and the connection switching unit connects the second communication interface with the first communication interface to establish a VoIP communication channel so that the PSTN communication terminal performs VoIP communication through the established VoIP communication channel.

Meanwhile, an embodiment further provides a method for transmitting voice signal by the separation device. The method includes that: the connection switching unit of the separation device learns that the second communication interface receives VoIP communication signals and VoIP communication connection initiated by the first communication interface does not exist; and the connection switching unit connects the second communication interface with the first communication interface to establish a VoIP communication channel so that the PSTN communication terminal performs VoIP communication through the established VoIP communication channel.

In the technology provided by the embodiments, because a connecting and switching functional unit is set in the separation device, the separation device may perform switching a line connected to the PSTN communication terminal according to different call types (PSTN call type and VoIP call type) so that the PSTN communication terminal may implement the PSTN communication and the VoIP communication respectively.

BRIEF DESCRIPTION OF THE DRAWINGS

In order to clearly describe the technical solutions of the embodiments or the prior art, accompanying drawings which are used in the descriptions of the embodiment or the prior art are briefly introduced as follows. Obviously, the accompanying drawings described below only illustrate certain embodiments, and to those of ordinary skill in the art, other accompanying drawings may be obtained according to the accompanying drawings without creative work.

DETAILED DESCRIPTION

The technical solutions in the embodiments are described clearly and fully by reference to the accompanying drawings of the embodiments. The described embodiments are merely exemplary. Other embodiments that may be obtained by those of ordinary skill in the art based on the described embodiments are considered to fall within the scope of protection afforded by the claims.

Figure 1:
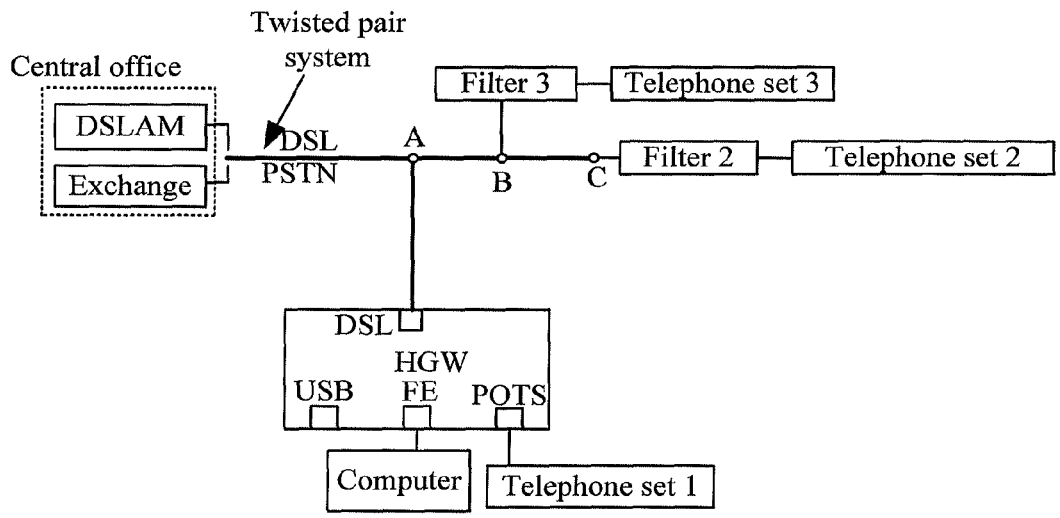
FIG. 1 is a connection schematic diagram of an existing home network accessed through the xDSL.
Figure 2:
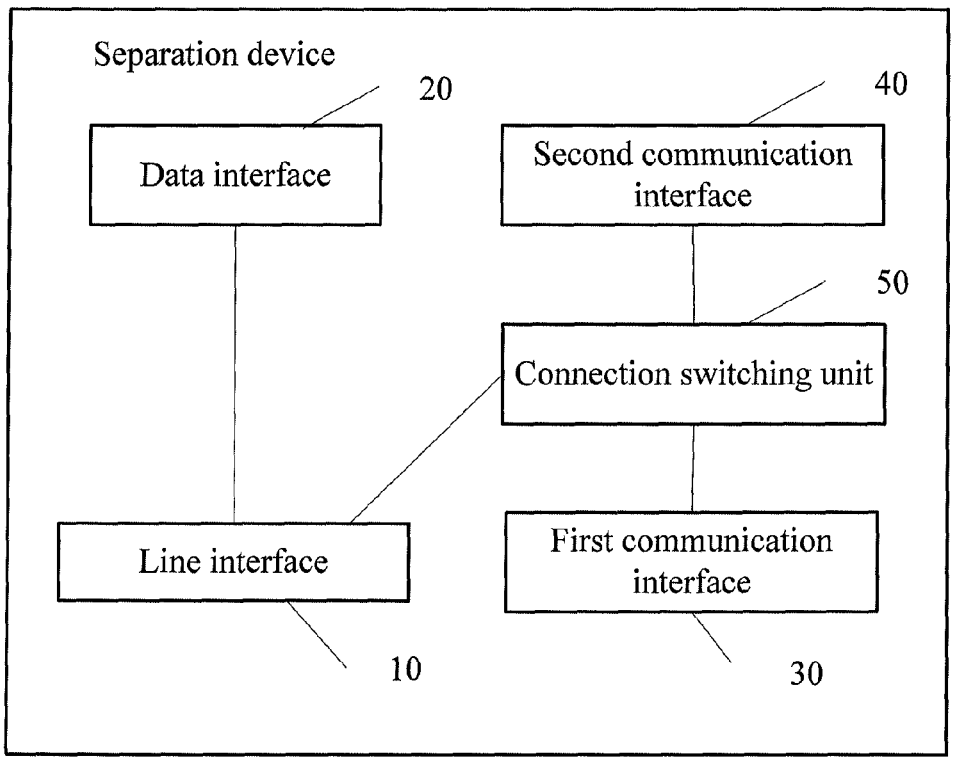
FIG. 2 is a schematic diagram of a specific structure of the separation device according to an embodiment.

FIG. 2 is a schematic diagram of a specific structure of the separation device according to an embodiment. The separation device includes a line interface 10, a data interface 20, a first communication interface 30, a second communication interface 40 and a connection switching unit 50.

The line interface 10 is adapted to provide an interface for connecting to a telecommunication access system which provides public switched telephone network (PSTN) and data services. For example, the separation device is connected with a twisted pair from a communication access system to a home network through the interface so as to receive and transmit communication network data.

The data interface 20 is adapted to provide an interface connected with CPE and adapted to be connected with the line interface. For example, equipment such as an HGW, etc. is connected through the interface to implement data service input and output.

The first communication interface 30 is adapted to provide an interface connected with a PSTN communication terminal. For example, the first communication interface 30 provides a connection interface with telephones providing the conventional PSTN services.

The second communication interface 40 is adapted to provide an interface connected with an FXS interface of the CPE, that is, the second communication interface 40 may be directly connected with the FXS interface of the CPE and a VoIP telephone system, the FXS interface of the CPE may be directly connected with a telephone, and the phone directly connected with the FXS interface may only communicate via VoIP.

The connection switching unit 50 is adapted to connect the first communication interface 30 with the line interface 10 or to connect the first communication interface 30 with the second communication interface 40, and to perform switching between the two connections so as to implement PSTN communication and VoIP communication respectively.

Signals are transmitted through the following route when the VoIP communication is implemented: the line interface←→the data interface←→the CPE data interface (for example, an ADSL interface of the HGW)←→the FXS interface of the CPE←→the second communication interface of the separation device←→the first communication interface←→a PSTN telephone.

In this way, connection between the PSTN telephone (connected with the first communication interface) and a PSTN communication line (through the line interface) is provided in the separation device, and connection between the PSTN telephone and a VoIP communication line (through the second communication interface) is provided, which causes the PSTN telephone to be capable of respectively implementing the PSTN communication and the VoIP communication respectively so as to expand applicable services of the PSTN telephone.

Figure 3:
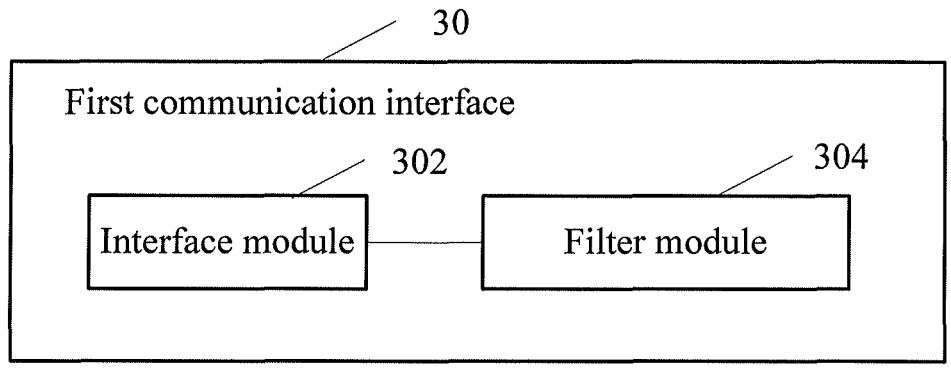
FIG. 3 is a structure schematic diagram according to an embodiment of the first communication interface in FIG. 2.

The first communication interface 30 as shown in FIG. 3 may include an interface module 302 which is adapted to provide an interface connected with the PSTN communication terminal; and a filter module 304 which is adapted to connect a loop connection module 501 (see description in FIG. 4) with the interface module 302 and to perform voice signal filtering on signals transmitted between the loop connection module 501 and the interface module 302. In the embodiments, data signals and PSTN telephone signals occupy different frequency bands and share a line of twisted pair system. Therefore, the signals output to the PSTN telephone through the first communication interface require to be filtered to obtain the PSTN telephone signals.

Figure 4:
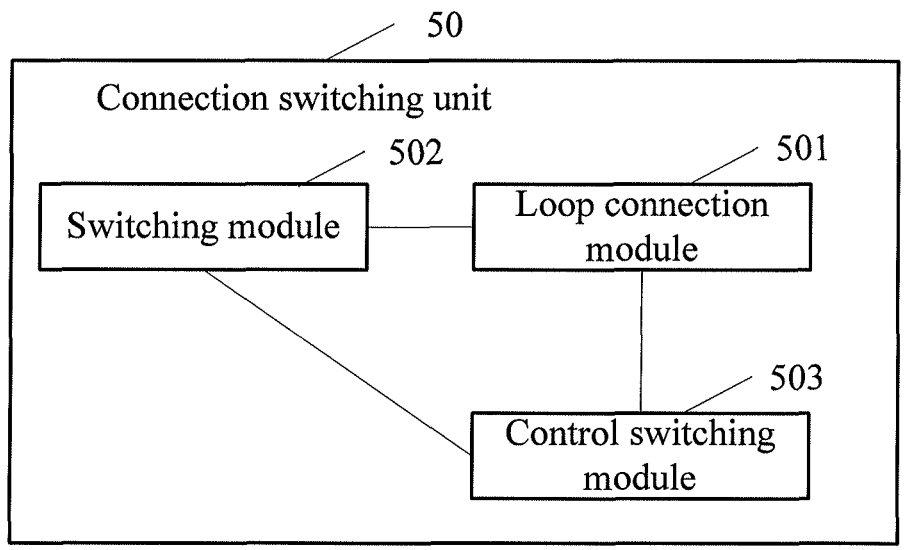
FIG. 4 is a structure schematic diagram according to an embodiment of the connection switching unit in FIG. 2.

As shown in FIG. 4, the connection switching unit 50 further includes a loop connection module 501, a switching module 502 and a control switching module 503.

The loop connection module 501 is adapted to connect the line interface 10 with the first communication interface 30 or to connect the second communication interface 40 with the first communication interface 30. The loop connection module may include a relay switching loop which is employed to perform connection switching according to switching control of the switching module 502 and the control switching module 503.

The switching module 502 is adapted to switch the loop connection module 501 to connection between the line interface 10 and the first communication interface 30 when dial-out communication type is the PSTN communication, and to switch the loop connection module 501 to the connection between the first communication interface 30 and the second communication interface 40 when the dial-out communication type is the VoIP communication.

The switching module 502 may be a mechanical switch controlled externally, the switching module 502 is switched to switch the loop connection module 501 to the connection between the line interface 10 and the first communication interface 30 when a user of the PSTN communication terminal requires the PSTN communication; or in a similar way, the switching module 502 is switched to switch the loop connection module 501 to the connection between the first communication interface 30 and the second communication interface 40 when the user requires the VoIP communication.

A control switching module 503 is adapted to detect a connection condition switched by the switching module 502 and a dial-in state, to switch the loop connection module 501 to the connection between the line interface 10 and the first communication interface 30 when there is no dialing-out communication and the dial-in state is the PSTN communication, and to switch the loop connection module 501 to the connection between the first communication interface 30 and the second communication interface 40 when there is no dialing-out communication and the dial-in state is the VoIP communication.

Figure 5:
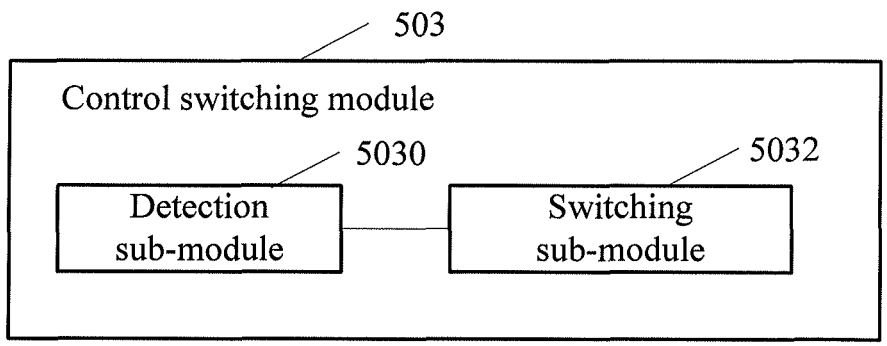
FIG. 5 is a structure schematic diagram according to an embodiment of the control switching module in FIG. 4.

As shown in FIG. 5, the control switching module 503 may further include a detection sub-module 5030 and a switching sub-module 5032.

The detection sub-module 5030 is adapted to detect connection condition of the loop connection module 501 and to learn the dial-in state by detecting ringing signals on a line through optical coupling. For example, the dial-in state of a VoIP telephone is detected when the current connection switched by the loop connection module is PSTN telephone connection; and the dial-in state of a PSTN telephone is detected when the current connection switched by the loop connection module is VoIP telephone connection. The ringing signals may be voltage signals or current signals, etc.

The switching sub-module 5032 is adapted to switch the loop connection module 501 to the connection between the line interface 10 and the first communication interface 30 when the dial-in state detected by the detection sub-module 5030 is the PSTN communication and there is no dialing-out communication, and switch the loop connection module 501 to the connection between the first communication interface 30 and the second communication interface 40 when the dial-in state is the VoIP communication and there is no dialing-out communication.

In the solutions provided in the embodiment, corresponding line switching and connection functions may be realized by simple circuits, for example, the relay switching loop, the mechanical switch, an optical coupling detection circuit, etc., the solution is simple, of low cost and is favorable for product popularization.

Figure 6:
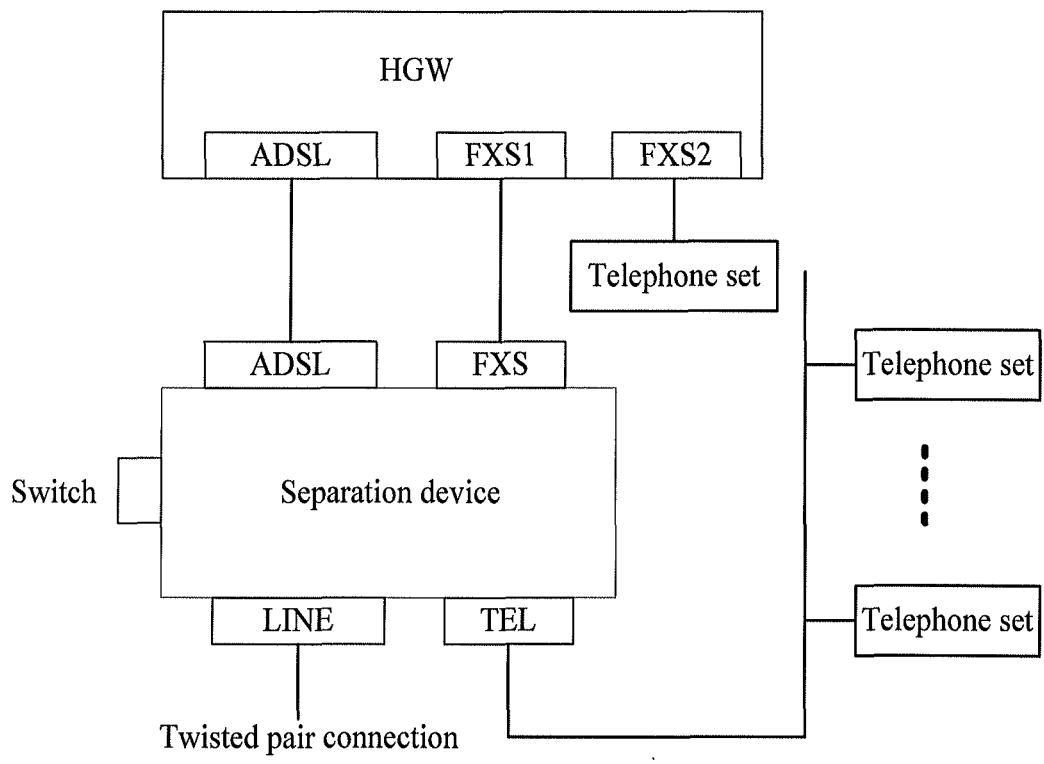
FIG. 6 is a connection schematic diagram of the separation device according to an embodiment in a home network.

FIG. 6 is a connection schematic diagram of the separation device according to an embodiment in a home network. LINE is a specific form of the line interface, TEL is a specific form of the first communication interface, FXS is a specific form of the second communication interface and ADSL is a specific form of the data interface. The HGW connected with the separation device is also provided with corresponding interfaces which are connected with the separation device and other related equipment (for example, a telephone set).

Figure 7:
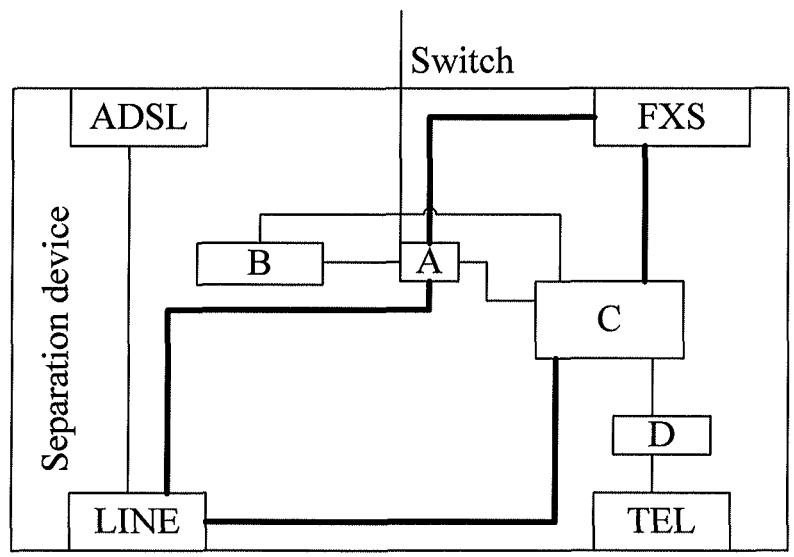
FIG. 7 is schematic diagram of another specific structure of the separation device according to an embodiment.

FIG. 7 is a schematic diagram of a specific structure of the separation device in FIG. 6. In order to simplify diagrammatic presentation; other modules apart from interfaces in the figure are marked with letters. Each letter-marked modules and functions of the modules are described as follows:

A is the mechanical switch controlled externally which is used by a user to select whether to dial out a PSTN telephone call or a VoIP telephone call, and control a module B to detect signals of the LINE or the FXS interface; B is a signal detection loop and a relay control loop which control the switching of a module C by detecting ringing signals on a line through optical coupling; C is a relay switching loop which is adapted to switch connection between the TEL and the FXS or the TEL and the LINEs; and D is a low pass filter which is adapted to implement low-pass filtering of voice signals.

The line indicated in the module B is a PSTN or a VoIP telephone line, and the ringing signals are voltage signals by which an exchange informs a telephone set of ringing when a telephone is dialed in.

The module A is used to control C to connect the TEL with the FXS when the user dials out a VoIP telephone in default, and the module B is connected with the LINE to detect PSTN signals at the moment. In this case, an external VoIP telephone may be accessed directly through FXS-C-D-TEL. The module B controls the module C to switch and connects the TEL with the LINE after the module B detects external PSTN signals, thus implementing PSTN telephone access through LINE-C-D-TEL.

The module A is used to control C to connect the TEL with the LINE when the user dials out a PSTN telephone in default, and the module B is connected with the FXS to detect FXS signals at the moment. In this case, an external PSTN telephone may be accessed directly through LINE-C-D-TEL, and the module B controls the module C to switch and connects the TEL with the FXS after the module B detects external VoIP signals, thus implementing VoIP telephone access through FXS-C-D-TEL.

It may be known from descriptions of various embodiments that a connecting and switching functional unit is set in the separation device, then the separation device may perform switching of a line connected with the PSTN communication terminal according to different call types (PSTN call type and VoIP call type), so that the PSTN communication terminal may implement the PSTN communication and the VoIP communication respectively.

Figure 8:
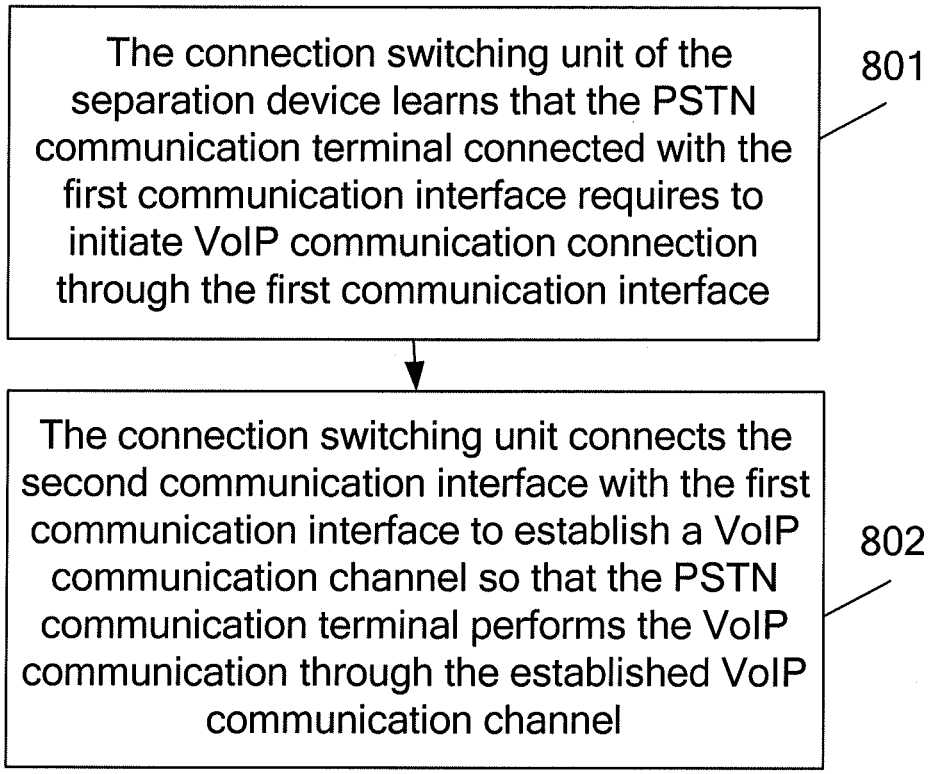
FIG. 8 is a specific flow schematic diagram of the method for transmitting voice signal by the separation device according to an embodiment.

Meanwhile, as shown in FIG. 8, the embodiment further provides a method of voice signal transmission by the separation device, and the method includes:

801. The connection switching unit of the separation device learns that the PSTN communication terminal connected with the first communication interface requires initiating VoIP communication connection through the first communication interface. For example, the mechanical switch controlled externally in the connection switching unit is controlled to cause the connection switching unit to learn that VoIP communication is required when a user of the PSTN communication terminal requires the VoIP communication.

802. The connection switching unit connects the second communication interface with the first communication interface to establish a VoIP communication channel so that the PSTN communication terminal performs the VoIP communication through the established VoIP communication channel.

Connection between the PSTN communication terminal such as a PSTN telephone (connected with the first communication interface) and a VoIP communication line (through the second communication interface) is provided in the separation device, which causes the PSTN communication terminal to be capable of implementing initialization of the VoIP communication and expands applicable services of the PSTN telephone on the basis of the PSTN communication.

Figure 9:
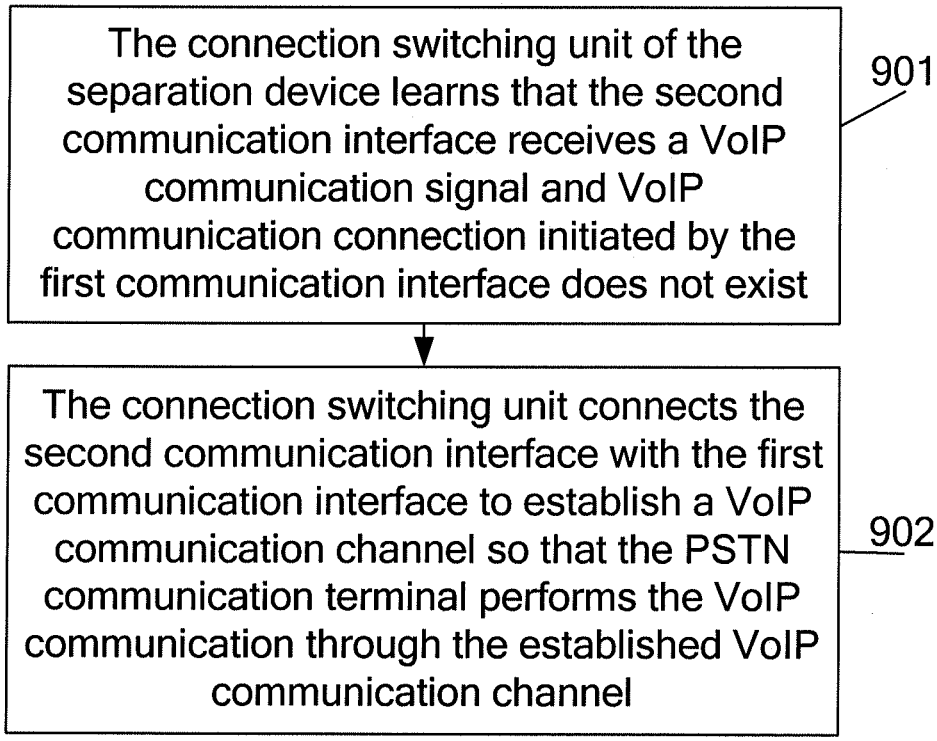
FIG. 9 is another specific flow diagram of the method for transmitting voice signal by the separation device according to an embodiment.

As shown in FIG. 9, the embodiment further provides another method of voice signal transmission by the separation device, and the method includes:

901. The connection switching unit of the separation device learns that the second communication interface receives VoIP communication signals and VoIP communication connection initiated by the first communication interface does not exist. For example, the connection switching unit of the separation device learns that the VoIP communication connection initiated by the first communication interface does not exist by detecting the loop connection condition, and learns that the second communication interface receives VoIP communication signals by detecting ringing signals on a line by optical coupling.

902. The connection switching unit connects the second communication interface with the first communication interface to establish a VoIP communication channel so that the PSTN communication terminal performs the VoIP communication through the established VoIP communication channel.

The VoIP communication channel described in the embodiments of FIG. 8 and FIG. 9 includes the line interface, the data interface, the interface connected with the data interface in the CPE, the FXS interface of the CPE, the second communication interface and the first communication interface which are sequentially connected.

Connection between the PSTN communication terminal such as a PSTN telephone (connected with the first communication interface) and a VoIP communication line (through the second communication interface) is provided by the separation device, which causes the PSTN communication terminal to be capable of realizing the VoIP communication so as to expand applicable services of the PSTN telephone on the basis of the PSTN communication when no VoIP communication is calling out.

It may be known from the descriptions of various embodiments that a transmission loop of a VoIP telephone signal is set to cause the PSTN communication terminals to be capable of implementing the VoIP communication respectively.

The described device embodiments are only exemplary, the units described as separated parts may be or may not be physically separated, and the parts displayed as units may be or may not be physical units, that is, the parts may be located in a place or distributed in multiple network units. Part or all of the modules thereof may be selected according to actual requirements to realize the purposes of the solutions of the embodiment. The embodiments may be understood and implemented by those of ordinary skill in the art without creative work.

Those of ordinary skill may understand that: the implementation of all or part of the steps in the above-mentioned method embodiments may be completed by hardware related to program instructions. The program may be stored in a computer readable storage medium. During running, the program executes the steps comprising the above-mentioned method embodiments. The storage medium comprises the various media which are able to store program codes such as ROM, RAM, diskette or compact disc, etc.

It should be understood that the above embodiments are only used to illustrate, but not to limit the technical solution of the present disclosure. In despite of the detailed description of the present disclosure with reference to above exemplary embodiments, it should be understood that various modifications, changes or equivalent replacements may be made by those skilled in the art without departing from the scope of the present disclosure and covered in the claims of the present disclosure.

What is claimed is:

1. A separation device, comprising:
a line interface, adapted to provide an interface for connecting to a telecommunication access system which provides public switched telephone network (PSTN) and data services;
a data interface, adapted to provide an interface connected with customer premises equipment (CPE) and adapted to connected with the line interface;
a first communication interface, adapted to provide an interface connected with a PSTN communication terminal;
a second communication interface, adapted to provide an interface connected with a foreign exchange station (FXS) interface of the CPE; and
a connection switching unit, adapted to connect the first communication interface with the line interface or to connect the first communication interface with the second communication interface, and to perform switching between the two connections so as to implement PSTN communication or Internet-based voice over IP (VoIP) communication respectively;
wherein the connection switching unit comprises:
a loop connection module, adapted to connect the line interface with the first communication interface or to connect the second communication interface with the first communication interface;
a switching module, adapted to switch the loop connection module to the connection between the line interface and the first communication interface when dial-out communication type is the PSTN communication, and to switch the loop connection module to the connection between the first communication interface and the second communication interface when the dial-out communication type is the VoIP communication; and
a control switching module, adapted to detect a connection condition switched by the switching module and a dial-in state, to switch the loop connection module to the connection between the line interface and the first communication interface when there is no dialing-out communication and the dial-in state is the PSTN communication, and to switch the loop connection module to the connection between the first communication interface and the second communication interface when there is no dialing-out communication and the dial-in state is the VoIP communication.

2. The separation device according to claim 1, wherein the first communication interface comprises:
an interface module, adapted to provide an interface connected with the PSTN communication terminal; and
a filter module, adapted to connect to the loop connection module and the interface module and to perform voice signal filtering on signals transmitted between the loop connection module and the interface module.

3. The separation device according to claim 1, wherein the switching module is a mechanical switch controlled externally.

4. The separation device according to claim 1, wherein the loop connection module is a relay switching loop which is adapted to perform connection switching according to switching control of the switching module and the control switching module.

5. The separation device according to claim 1, wherein the loop connection module is a relay switching loop which is adapted to perform connection switching according to switching control of the switching module and the control switching module.

6. The separation device according to claim 2, wherein the loop connection module is a relay switching loop which is adapted to perform connection switching according to switching control of the switching module and the control switching module.

7. The separation device according to claim 1, wherein the control switching module comprises:
a detection sub-module, adapted to detect connection condition of the loop connection module and to learn the dial-in state by detecting ringing signals on a line through optical coupling; and a switching sub-module, adapted to switch the loop connection module to the connection between the line interface and the first communication interface when the dial-in state detected by the detection sub-module is the PSTN communication and there is no dialing-out communication, and switch the loop connection module to the connection between the first communication interface and the second communication interface when the dial-in state is the VoIP communication and there is no dialing-out communication.

8. The separation device according to claim 1, wherein the control switching module comprises:
  a detection sub-module, adapted to detect connection condition of the loop connection module and to learn the dial-in state by detecting ringing signals on a line through optical coupling; and
  a switching sub-module, adapted to switch the loop connection module to the connection between the line interface and the first communication interface when the dial-in state detected by the detection sub-module is the PSTN communication and there is no dialing-out communication, and switch the loop connection module to the connection between the first communication interface and the second communication interface when the dial-in state is the VoIP communication and there is no dialing-out communication.

9. The separation device according to claim 2, wherein the control switching module comprises:
  a detection sub-module, adapted to detect connection condition of the loop connection module and to learn the dial-in state by detecting ringing signals on a line through optical coupling; and
  a switching sub-module, adapted to switch the loop connection module to the connection between the line interface and the first communication interface when the dial-in state detected by the detection sub-module is the PSTN communication and there is no dialing-out communication, and switch the loop connection module to the connection between the first communication interface and the second communication interface when the dial-in state is the VoIP communication and there is no dialing-out communication.

10. A method for transmitting voice signal, the method comprising:
  providing a separation device that includes:
    a line interface, adapted to provide an interface for connecting to a telecommunication access system which provides public switched telephone network (PSTN) and data services;
    a data interface, adapted to provide an interface connected with customer premises equipment (CPE) and adapted to connect with the line interface;
    a first communication interface, adapted to provide an interface connected with a PSTN communication terminal;
    a second communication interface, adapted to provide an interface connected with a foreign exchange station (FXS) interface of the CPE; and
    a connection switching unit, adapted to connect the first communication interface with the line interface or to connect the first communication interface with the second communication interface, and to perform switching between the first communication interface and the second communication interface so as to implement PSTN communication or Internet-based voice over IP (VoIP) communication respectively;

wherein the connection switching unit comprises:
    a loop connection module, adapted to connect the line interface with the first communication interface or to connect the second communication interface with the first communication interface;
    a switching module, adapted to switch the loop connection module to the connection between the line interface and the first communication interface when dial-out communication type is the PSTN communication, and to switch the loop connection module to the connection between the first communication interface and the second communication interface when the dial-out communication type is the VoIP communication; and
    a control switching module, adapted to detect a connection condition switched by the switching module and a dial-in state, to switch the loop connection module to the connection between the line interface and the first communication interface when there is no dialing-out communication and the dial-in state is the PSTN communication, and to switch the loop connection module to the connection between the first communication interface and the second communication interface when there is no dialing-out communication and the dial-in state is the VoIP communication;
  learning, by the connection switching unit of the separation device, that the PSTN communication terminal connected with the first communication interface requires initiation of a VoIP communication connection through the first communication interface; and
  connecting, by the connection switching unit, the second communication interface with the first communication interface to establish a VoIP communication channel so that the PSTN communication terminal performs the VoIP communication via the established VoIP communication channel.

11. The method according to claim 10, wherein the VoIP communication channel comprises the line interface, the data interface, the interface in the CPE connected with the data interface, the FXS interface of the CPE, the second communication interface and the first communication interface which are sequentially connected.

12. A method for transmitting voice signal, the method comprising:
  providing a separation device that includes:
    a line interface, adapted to provide an interface for connecting to a telecommunication access system which provides public switched telephone network (PSTN) and data services;
    a data interface, adapted to provide an interface connected with customer premises equipment (CPE) and adapted to connect with the line interface;
    a first communication interface, adapted to provide an interface connected with a PSTN communication terminal;
    a second communication interface, adapted to provide an interface connected with a foreign exchange station (FXS) interface of the CPE; and
    a connection switching unit, adapted to connect the first communication interface with the line interface or to connect the first communication interface with the second communication interface, and to perform switching between the first communication interface and the second communication interface so as to implement PSTN communication or Internet-based voice over IP (VoIP) communication respectively;

wherein the connection switching unit comprises:
- a loop connection module, adapted to connect the line interface with the first communication interface or to connect the second communication interface with the first communication interface;
- a switching module, adapted to switch the loop connection module to the connection between the line interface and the first communication interface when dial-out communication type is the PSTN communication, and to switch the loop connection module to the connection between the first communication interface and the second communication interface when the dial-out communication type is the VoIP communication; and
  - a control switching module, adapted to detect a connection condition switched by the switching module and a dial-in state, to switch the loop connection module to the connection between the line interface and the first communication interface when there is no dialing-out communication and the dial-in state is the PSTN communication, and to switch the loop connection module to the connection between the first communication interface and the second communication interface when there is no dialing-out communication and the dial-in state is the VoIP communication;

learning, by the connection switching unit of the separation device, that the second communication interface receives a VoIP communication signal and VoIP communication connection initiated by the first communication interface does not exist; and connecting, by the connection switching unit, the second communication interface with the first communication interface to establish a VoIP communication channel so that the PSTN communication terminal performs the VoIP communication via the established VoIP communication channel.

13. The method according to claim 12, wherein the learning, by the connection switching unit of the separation device, that the second communication interface receives a VoIP communication signal and VoIP communication connection initiated by the first communication interface does not exist comprises:
  - learning, by the connection switching unit of the separation device, that the VoIP communication connection initiated by the first communication interface does not exist by detecting the loop connection condition, and learning that the second communication interface receives the a VoIP communication signal by detecting ringing signals on a line through optical coupling.

14. The method according to claim 12, wherein the VoIP communication channel comprises the line interface, the data interface, the interface in the CPE connected with the data interface, the FXS interface of the CPE, the second communication interface and the first communication interface which are sequentially connected.

15. The method according to claim 13, wherein the VoIP communication channel comprises the line interface, the data interface, the interface in the CPE connected with the data interface, the FXS interface of the CPE, the second communication interface and the first communication interface which are sequentially connected.

\* \* \* \* \*